United States Patent
Hibino et al.

(10) Patent No.: US 9,905,868 B2
(45) Date of Patent: Feb. 27, 2018

(54) HUMIDITY CONTROL METHOD INCLUDING AC IMPEDANCE MEASUREMENT FOR FUEL CELL AND A FUEL CELL SYSTEM

(71) Applicant: HONDA MOTOR CO., LTD., Minato-Ku, Tokyo (JP)

(72) Inventors: Kiyohide Hibino, Utsunomiya (JP); Chikara Iwasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 14/336,039

(22) Filed: Jul. 21, 2014

(65) Prior Publication Data

US 2015/0024295 A1    Jan. 22, 2015

(30) Foreign Application Priority Data

Jul. 22, 2013  (JP) .................................. 2013-151594
Jun. 26, 2014  (JP) .................................. 2014-131578

(51) Int. Cl.
  *H01M 8/04*       (2016.01)
  *H01M 8/04492*    (2016.01)
  *H01M 8/04828*    (2016.01)
  *H01M 8/04537*    (2016.01)
  *H01M 8/1018*     (2016.01)

(52) U.S. Cl.
  CPC ... *H01M 8/04492* (2013.01); *H01M 8/04649* (2013.01); *H01M 8/04828* (2013.01); *H01M 8/04835* (2013.01); *H01M 2008/1095* (2013.01)

(58) Field of Classification Search
  USPC .......................................... 429/413, 408, 414
  See application file for complete search history.

(56) References Cited

U.S. PATENT DOCUMENTS

| 2009/0226770 A1* | 9/2009 | Manabe | H01M 8/04567 429/431 |
| 2010/0141262 A1* | 6/2010 | Watanabe | H01M 8/04119 324/430 |
| 2010/0291446 A1* | 11/2010 | Aso | B60L 11/1887 429/429 |
| 2011/0008699 A1* | 1/2011 | Hashimoto | H01M 8/04119 429/444 |

FOREIGN PATENT DOCUMENTS

| JP | 2002367650 A | * 12/2002 |
| JP | 2003-086220 A | 3/2003 |
| JP | 2009-004299 A | 1/2009 |

OTHER PUBLICATIONS

Tsurumaki et al., Machine translation of JP 2002-367650 A, Dec. 2002.*

* cited by examiner

*Primary Examiner* — Sean P Cullen
(74) *Attorney, Agent, or Firm* — Carrier Blackman & Associates, P.C.; Joseph P. Carrier; Anne G. Sabourin

(57) ABSTRACT

A method of controlling humidification of a fuel cell includes the steps of measuring impedance of the fuel cell, and adjusting humidification quantity of the fuel cell based on an imaginary axis value Xi and a real axis value Xr on a complex number plane of the measured impedance after the measurement step. In the measurement step, impedance is measured based on supply of alternating current having one frequency of 10 Hz or less during power generation of the fuel cell.

6 Claims, 7 Drawing Sheets

HUMIDITY CONTROL METHOD INCLUDING AC IMPEDANCE MEASUREMENT FOR FUEL CELL AND A FUEL CELL SYSTEM

CROSS-REFERENCE TO RELATED APPLICATIONS

This application is based upon and claims the benefit of priority from Japanese Patent Applications No. 2013-151594 filed on Jul. 22, 2013 and No. 2014-131578 filed on Jun. 26, 2014, the contents all of which are incorporated herein by reference.

BACKGROUND OF THE INVENTION

Field of the Invention

The present invention relates to a humidification control method for a fuel cell and a fuel cell system. The fuel cell is formed by stacking an electrolyte electrode assembly and a separator. The electrolyte electrode assembly includes a cathode, an anode, and an electrolyte interposed between the cathode and the anode.

Description of the Related Art

For example, a fuel cell includes a membrane electrode assembly (MEA) and separators sandwiching the MEA. The membrane electrode assembly includes a cathode, an anode, and an electrolyte membrane (or an electrolyte) interposed between the cathode and the anode. The electrolyte membrane is a polymer ion exchange membrane. In use, a plurality of the fuel cells are stacked together to form a fuel cell stack, e.g., mounted in a vehicle.

In this type of the fuel cell, in order to stabilize the power generation performance, it is required to maintain the electrolyte membrane to be in a suitable humidified state. For example, if the membrane electrode assembly is dried, the internal resistance of the fuel cell becomes large, and the output voltage is decreased. If excessive water is present in the membrane electrode assembly or reactant gas flow fields, a phenomenon (flooding) which inhibits, e.g., diffusion of reactant gases occurs, and the output voltage of the fuel is decreased. In an attempt to address the problem, in a fuel cell system which controls the fuel cell, at the time of power generation, humidification control is implemented by measuring the quantity of water (water content) in the fuel cell system.

In this regard, it is known that the water content of the fuel cells changes in accordance with impedance of the fuel cells. Therefore, in the fuel cell system, alternating current is applied to the fuel cells at different frequencies, and impedance is measured at a plurality of frequency points. Based on the results of this impedance measurement, the water content of the fuel cells is estimated.

For example, fuel cell systems disclosed in Japanese Laid-Open Patent Publication No. 2003-086220 and Japanese Laid-Open Patent Publication No. 2009-004299 adopt structure where alternating current is applied at two different frequencies to calculate alternating current impedance where the frequency varies from a high frequency ($\omega=\infty$) to a low frequency ($\omega=0$).

SUMMARY OF THE INVENTION

In the fuel cell systems disclosed in Japanese Laid-Open Patent Publication No. 2003-086220 and Japanese Laid-Open Patent Publication No. 2009-004299, at the time of measuring impedance, control is implemented to apply alternating current to the fuel cells at two different frequencies. For this purpose, since structure and control to change the frequency of the alternating current is required, the fuel cell system tends to be complicated and a long period of time is required for measurement of impedance disadvantageously. Further, in humidification control for the fuel cells, since measurement of impedance is time consuming, it is difficult to implement the control in accordance with the successively changing water content of the fuel cells.

The present invention has been made to solve the above problems, and an object of the present invention is to provide a humidification control method for fuel cells and a fuel cell system which make it possible to rapidly and suitably control the humidified state of the fuel cells by performing impedance measurement easily using alternating current having a low frequency.

In order to achieve the above object, the present invention is directed to a method of controlling humidification of a fuel cell formed by stacking an electrolyte electrode assembly and a separator. The electrolyte electrode assembly includes a cathode, an anode, and an electrolyte interposed between the cathode and the anode. The method includes the steps of measuring impedance of the fuel cell during power generation of the fuel cell based on supply of alternating current having one frequency of 10 Hz or less, and adjusting humidification quantity of the fuel cell based on an imaginary axis value and a real axis value on a complex number plane of the measured impedance after the measuring step.

In the above method, by measuring impedance of the fuel cell based on supply of alternating current having one frequency of 10 Hz or less, it is possible to simplify the structure of the measuring instrument and the control at the time of measurement. Therefore, the fuel cell system which implements the humidification control method can measure impedance of the fuel cell rapidly, and easily determine the humidified state (water content) of the fuel cell based on the measured impedance. In the fuel cell system, by changing the humidification quantity immediately in accordance with the change of the water content in the fuel cells, degradation of the electrolyte electrode assembly is suppressed, and the product life of the fuel cell stack is extended.

In this case, preferably, the method further includes, after the measurement step, the step of making a determination based on a preset imaginary part threshold value and the imaginary axis value, and then, making a determination based on a preset real part threshold value and the real axis value.

In this manner, by making the determination based on the preset imaginary part threshold value and the imaginary axis value beforehand, in the humidification control method, it is possible to determine whether the water content in the fuel cell is normal or abnormal easily.

Further, preferably, if it is determined that the imaginary axis value exceeds the imaginary part threshold value and the real axis value exceeds the real part threshold value in the determination step, the humidification quantity of the fuel cell is increased in the adjustment step.

In this manner, by determining that the imaginary axis value exceeds the imaginary part threshold value and the real axis value exceeds the real part threshold value in the determination step, it is possible to identify the dry state in the fuel cell in a short period of time. Accordingly, in the humidification control method, it is possible to immediately implement control to increase the humidification quantity of the fuel cells.

Otherwise, preferably, if it is determined that the imaginary axis value exceeds the imaginary part threshold value and the real axis value does not exceed the real part threshold value in the determination step, the humidification quantity of the fuel cell is decreased in the adjustment step.

In this manner, by determining that the imaginary axis value exceeds the imaginary part threshold value and the real axis value does not exceed the real part threshold value in the determination step, it becomes possible to identify the flooding state in the fuel cell in a short period of time. Accordingly, in the humidification control method, it is possible to immediately implement control to decrease the humidification quantity of the fuel cell.

Further, in order to achieve the above object, the present invention is directed to a fuel cell system including a fuel cell formed by stacking an electrolyte electrode assembly and a separator. The electrolyte electrode assembly includes a cathode, an anode, and an electrolyte interposed between the cathode and the anode. The fuel cell system includes a measuring apparatus for measuring impedance of the fuel cell during power generation of the fuel cell by supplying alternating current having one frequency of 10 Hz or less, and a control unit for controlling humidification quantity of the fuel cell based on an imaginary axis value and a real axis value on a complex number plane of the impedance measured by the measuring apparatus.

In the present invention, measurement of impedance is easily performed using alternating current of a low frequency. Therefore, it is possible to control the humidified state of the fuel cell rapidly and suitably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a humidification control method for a fuel cell according to the present invention will be described in relation to a fuel cell system, and the embodiment will be described in details with reference to the drawings.

During power generation of a fuel cell, a fuel cell system according to an embodiment of the present invention measures impedance of the fuel cell, and implements humidification control for the fuel cell. For example, this fuel cell system is mounted in an automobile as an in-vehicle system for supplying electrical energy to a power source such as a motor during traveling of the automobile. It should be noted that the fuel cell system is not limited for use in the in-vehicle application. The fuel cell system may be used in various applications such as a stationary application.

Figure 1:
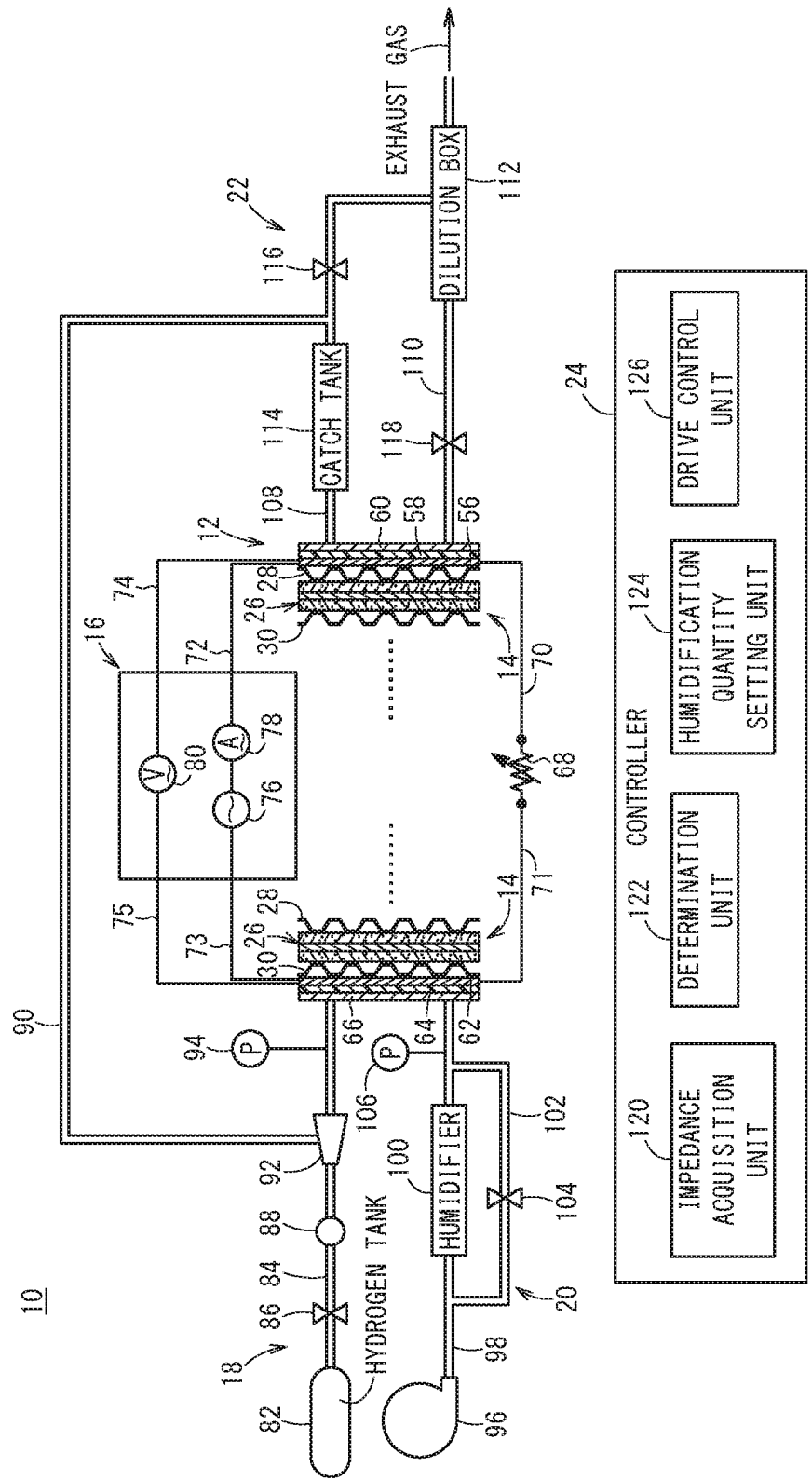
FIG. 1 is a diagram showing the overall structure of a fuel cell system according to an embodiment of the present invention.

As shown in FIG. 1, a fuel cell system 10 includes a fuel cell stack 12 formed by stacking a plurality of fuel cells 14, and an impedance measuring apparatus 16 for measuring impedance of the fuel cells 14. Further, the fuel cell system 10 includes a fuel gas supply system 18, an oxygen-containing gas supply system 20, and a gas discharge system 22, for supplying reactant gases to, and discharging the reactant gases from the fuel cell stack 12. Additionally, the fuel cell system 10 includes a controller 24 (control unit) for controlling the supply and discharge of the reactant gases.

Figure 2:
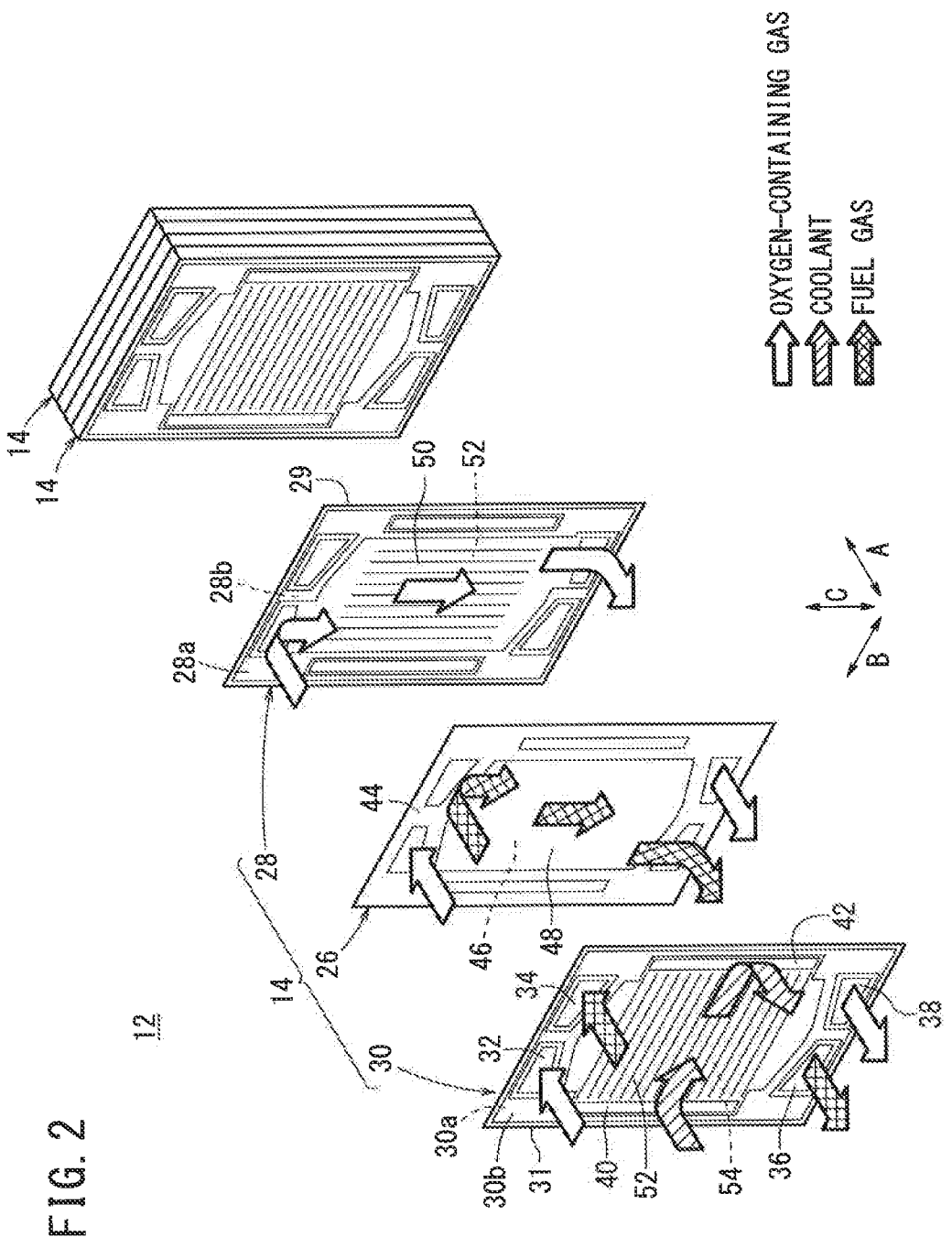
FIG. 2 is an exploded perspective view showing main components of a fuel cell stack of a fuel cell system of FIG. 1.

As shown in FIG. 2, each of the fuel cells 14 of the fuel cell system 10 includes a membrane electrode assembly 26 (electrolyte electrode assembly) and a first separator 28 and a second separator 30 sandwiching the membrane electrode assembly 26. Hereinafter, with regard to directions of the fuel cells 14, explanations will be given based on directions indicated by arrows A to C shown in FIG. 2. The direction indicated by the arrow A is a stacking direction of the fuel cells 14 in FIG. 2, the direction indicated by the arrow B is a horizontal direction of the fuel cells 14 in FIG. 2, and the direction indicated by the arrow C is a vertical direction of the fuel cells 14 in FIG. 2.

An oxygen-containing gas supply passage 32 for supplying an oxygen-containing gas and a fuel gas supply passage 34 for supplying a fuel gas are provided adjacent to an upper end of the fuel cell 14 in the direction indicated by the arrow C, and arranged side by side in the direction indicated by the arrow B. The oxygen-containing gas supply passage 32 and the fuel gas supply passage 34 extend through the fuel cell 14 in the direction indicated by the arrow A. A fuel gas discharge passage 36 for discharging the fuel gas and an oxygen-containing gas discharge passage 38 for discharging the oxygen-containing gas are provided adjacent to a lower end of the fuel cell 14 in the direction indicated by the arrow C, and arranged side by side in the direction indicated by the arrow B. The fuel gas discharge passage 36 and the oxygen-containing gas discharge passage 38 extend through the fuel cell 14 in the direction indicated by the arrow A. Further, a coolant supply passage 40 for supplying a coolant is provided at one end of the fuel cell 14 in the direction indicated by the arrow B, and a coolant discharge passage 42 for discharging the coolant is provided at the other end of the fuel cell 14 indicated by the arrow B.

The membrane electrode assembly 26 includes a cathode 46, an anode 48, and a solid polymer electrolyte membrane 44 interposed between the cathode 46 and the anode 48. The solid polymer electrolyte membrane 44 is formed by impregnating a fluorine based ion exchange membrane or a hydrocarbon based ion exchange membrane with water, for example.

Each of the cathode 46 and the anode 48 has an electrode catalyst layer on both surfaces of the solid polymer electrolyte membrane 44 and a gas diffusion layer such as a carbon paper provided on the electrode catalyst layer. The electrode catalyst layer of the cathode 46 and the electrode catalyst layer of the anode 48 are formed by uniformly applying porous carbon particles supporting platinum alloy thereon to both surfaces of the solid polymer electrolyte membrane 44, respectively.

The first separator 28 and the second separator 30 are metal separators or carbon separators. The first separator 28 has an oxygen-containing gas flow field 50 on its surface 28a facing the membrane electrode assembly 26. The oxygen-containing gas flow field 50 extends in the direction indicated by the arrow C to connect the oxygen-containing gas supply passage 32 and the oxygen-containing gas discharge passage 38. The first separator 28 has a coolant flow field 52 on its surface 28b opposite to the oxygen-containing gas flow field 50. The coolant flow field 52 extends in the direction indicated by the arrow B to connect the coolant supply passage 40 and the coolant discharge passage 42.

The second separator 30 has a fuel gas flow field 54 on its surface 30a facing the membrane electrode assembly 26. The fuel gas flow field 54 extends in the direction indicated by the arrow C to connect the fuel gas supply passage 34 and the fuel gas discharge passage 36. Likewise, in the same manner as in the case of the first separator 28, the second separator 30 has the coolant flow field 52 on its surface 30b opposite to the fuel gas flow field 54.

A first seal member 29 and a second seal member 31 are formed integrally with the first separator 28 and the second separator 30, respectively, or members separate from the first separator 28 and the second separator 30 may be provided as the first seal member 29 and the second seal member 31 on the first separator 28 and the second separator 30, respectively, for preventing leakage of the fuel gas, the oxygen-containing gas, and the coolant. Each of the first seal member 29 and the second seal member 31 is made of elastic seal material, cushion material, or packing material such as an EPDM (Ethylene Propylene Diene Monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Referring back to FIG. 1, in the fuel cell stack 12, at one end of the fuel cells 14 in the stacking direction, a terminal plate 56, an insulating plate 58, and an end plate 60 are stacked. At the other end of the fuel cells 14 in the stacking direction, a terminal plate 62, an insulating plate 64, and an end plate 66 are stacked. External cables 70, 71 are electrically connected to the terminal plates 56, 62, and the external cables 70, 71 are connected to an external load 68 for allowing the fuel cell stack 12 to supply the output (electricity) produced in its power generation to the external load 68. The external load 68 may include various electrical/electronic devices as parts of electrical system in the vehicle, such as a traction motor (not shown) for traveling of the vehicle, and a compressor 96 for supplying air to the fuel cells 14.

The impedance measuring apparatus 16 for the fuel cells 14 is configured to superimpose alternating current on the output of the fuel cell stack 12 to measure impedance. For this purpose, one current cable 72 and one voltage cable 74 of the impedance measuring apparatus 16 are connected to the terminal plate 56, and the other current cable 73 and the other voltage cable 75 of the impedance measuring apparatus 16 are connected to the terminal plate 62.

Further, the impedance measuring apparatus 16 is configured to measure the overall impedance of the fuel cells 14 of the fuel cell stack 12. This impedance measuring apparatus 16 measures impedance using the AC four-terminal method. An alternating current generator 76, an alternating current measuring instrument 78, and an alternating current voltage measuring instrument 80 are provided inside the impedance measuring apparatus 16. It is not essential to perform measurement of impedance for the fuel cells 14 as a whole. Measurement of impedance may be performed for at least one fuel cell 14 of the fuel cells 14 of the fuel cell stack 12. Alternatively, measurement of impedance may be performed at predetermined positions of the fuel cell stack 12 for a plurality of fuel cells 14 electrically connected in series.

The alternating current generator 76 and the alternating current measuring instrument 78 are connected in series within the impedance measuring apparatus 16, and connected to the current cables 72, 73. The alternating current generator 76 outputs alternating current having a predetermined frequency between the terminal plates 56, 62 under the control of the controller 24. The alternating current measuring instrument 78 measures the electrical current value of the alternating current outputted from the alternating current generator 76. The alternating current voltage measuring instrument 80 is connected to the voltage cables 74, 75 for measuring the voltage between the terminal plates 56, 62. The impedance measuring apparatus 16 calculates impedance based on a current detection value from the alternating current measuring instrument 78 and a voltage detection value from the alternating current voltage measuring instrument 80. The impedance measuring apparatus 16 is not limited to the above structure. It is a matter of course that various structures capable of measuring impedance by the alternating current impedance method can be adopted.

Next, reactant gas supply/discharge systems of the fuel cell system 10 will be described.

The fuel gas supply system 18 supplies a fuel gas such as a hydrogen-containing gas to the fuel cell stack 12. The fuel gas supply system 18 includes a hydrogen tank 82 as a fuel gas supply source and a fuel gas supply channel 84 connected from this hydrogen tank 82 to the fuel cell stack 12. An interruption valve 86 for supplying or interrupting the supply of the fuel gas, a pressure reducing valve 88 for regulating the pressure of the fuel gas, and an ejector 92 are provided in the fuel gas supply channel 84. The ejector 92 is connected to a fuel circulation channel 90 for circulating the fuel gas discharged from the fuel cell stack 12. A pressure sensor 94 is provided in the fuel gas supply channel 84 downstream of the ejector 92, for detecting the pressure of the fuel gas flowing through the fuel gas supply channel 84.

The fuel circulation channel 90 connected to the ejector 92 is further connected to the gas discharge system 22 of the fuel cell stack 12 for circulating the fuel gas discharged from the fuel cell stack 12. Under the control of the controller 24, the ejector 92 is capable of sucking the discharged fuel gas, and supplying the sucked fuel gas to the fuel cell stack 12 through the fuel circulation channel 90.

The oxygen-containing gas supply system 20 supplies the oxygen-containing gas (e.g., the air) to the fuel cell stack 12. This oxygen-containing gas supply system 20 includes the compressor 96 (pump) for supplying the oxygen-containing gas and an oxygen-containing gas supply channel 98 connected from this compressor 96 to the fuel cell stack 12. Further, the oxygen-containing gas supply system 20 may be configured to regulate the stoichiometric ratio under the control of the controller 24. A humidifier 100 is provided in the oxygen-containing gas supply channel 98. An oxygen-containing gas bypass supply channel 102 is connected to the oxygen-containing gas supply channel 98 for bypassing this humidifier 100.

The humidifier 100 humidifies the oxygen-containing gas supplied from the compressor 96. For example, the humidifier 100 is connected to an off gas circulation channel (not shown) for circulating the cathode off gas containing produced water from an oxygen-containing gas discharge channel 110 into the humidifier 100, and supplies a water content to the oxygen-containing gas through a hollow fiber membrane. The oxygen-containing gas may be humidified by directly injecting the water content, using an injector (not shown). A bypass valve 104 is provided in the oxygen-containing gas bypass supply channel 102. The opening angle of the bypass valve 104 is adjusted for regulating the humidification quantity of the oxygen-containing gas (supplied gas). Further, a pressure sensor 106 is provided in the oxygen-containing gas supply channel 98, downstream of a portion connected to the oxygen-containing gas bypass supply channel 102, for detecting the pressure of the oxygen-containing gas flowing through the oxygen-containing gas supply channel 98. It is a matter of course that the oxygen-containing gas supply system 20 is not limited to this structure. For example, the bypass valve 104 may not be provided, and a three way valve may be provided at a portion coupling the oxygen-containing gas supply channel 98 and the oxygen-containing gas bypass supply channel 102. Further, the position of the humidifier 100 may not be limited to the oxygen-containing gas supply system 20. For example, the humidifier 100 may be provided in the fuel gas supply system 18, or may be provided in both of the fuel gas supply system 18 and the oxygen-containing gas supply system 20.

The gas discharge system 22 discharges the fuel gas and the oxygen-containing gas supplied to the fuel cell stack 12. The gas discharge system 22 includes a fuel gas discharge channel 108 as a passage of the anode off gas (fuel gas) supplied to the fuel cell stack 12, and the oxygen-containing gas discharge channel 110 as a passage of the cathode off gas (oxygen-containing gas) supplied to the fuel cell stack 12. The fuel gas discharge channel 108 and the oxygen-containing gas discharge channel 110 are merged (connected) at a dilution box 112. At the dilution box 112, hydrogen in the anode off gas discharged intermittently from the fuel gas discharge channel 108 is diluted by the cathode off gas from the oxygen-containing gas discharge channel 110.

Further, a catch tank 114 for collecting condensed water in the anode off gas and a purge valve 116 which is opened/closed as necessary in accordance with the power generation stability of the fuel cell stack 12 are provided in the fuel gas discharge channel 108. A back pressure valve 118 for controlling the pressure of the cathode off gas is provided in the oxygen-containing gas discharge channel 110.

The controller 24 of the fuel cell system 10 is a computer (ECU) for controlling the overall system, and also controls, e.g., the output of the fuel cell stack 12 as necessary. The controller 24 is connected to components such as the impedance measuring apparatus 16, the various valves 86, 88, 104, 116, 118, the ejector 92, and the compressor 96. For example, an impedance acquisition unit 120, a determination unit 122, a humidification quantity setting unit 124, a drive control unit 126, etc. are provided in the controller 24.

The impedance acquisition unit 120 acquires impedance measurement data (measured point X) of the fuel cells 14 from the impedance measuring apparatus 16. The impedance acquisition unit 120 may receive the voltage value and the electrical current value from the impedance measuring apparatus 16 to calculate impedance at the impedance acquisition unit 120.

The determination unit 122 recognizes the impedance acquired at the impedance acquisition unit 120 on a complex number plane, and compares the impedance with threshold values (imaginary part threshold value Ti, real part threshold value Tr). Then, the determination unit 122 determines the current water content (humidified state) of the fuel cell stack 12 based on this comparison.

Based on the determination result of the determination unit 122, the humidification quantity setting unit 124 determines a setting value to increase or decrease the humidification quantity of the fuel cell stack 12. The setting value of the humidification quantity set by this humidification quantity setting unit 124 is transmitted to the drive control unit 126, and the drive control unit 126 regulates opening/closing of the bypass valve 104 in corresponding with the setting value to change the humidification quantity of the fuel cell stack 12.

Further, in addition to the above control, the controller 24 can implement various controls. For example, based on the detection value from the pressure sensor 94, the controller 24 may drive the pressure-reducing valve 88 and the ejector 92 to control the quantity of the supplied fuel gas. At the same time, based on the detection value from the pressure sensor 106, the controller 24 may drive the compressor 96 and the bypass valve 104 to control the quantity of the supplied oxygen-containing gas. In this manner, under the control of the controller 24, power generation of the fuel cell stack 12 is performed stably and precisely.

Figure 3:
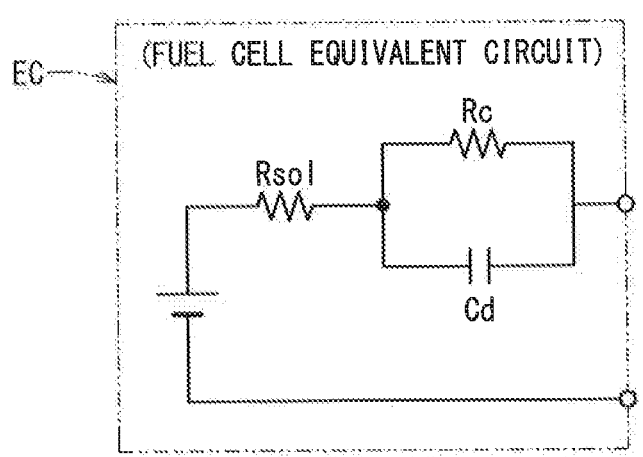
FIG. 3 is a diagram showing an equivalent circuit of fuel cells of the fuel cell stack of FIG. 1.

Next, measurement of impedance and humidification control of the fuel cell stack 12 (fuel cells 14) according to the embodiment of the present invention will be described specifically. Theoretically, the fuel cells 14 having the above structure acts like an equivalent circuit EC shown in FIG. 3. In FIG. 3, Rsol denotes a direct current resistance component including the resistance of the solid polymer electrolyte membrane 44, and the penetration resistance and the contact resistance of the members. Rc denotes a reaction resistance component including activation overpotential and concentration overpotential. Further, Cd denotes an electric double layer capacitance component (capacitor) formed at the interface between the electrode and the electrolyte (electrolytic solution).

Figure 4:
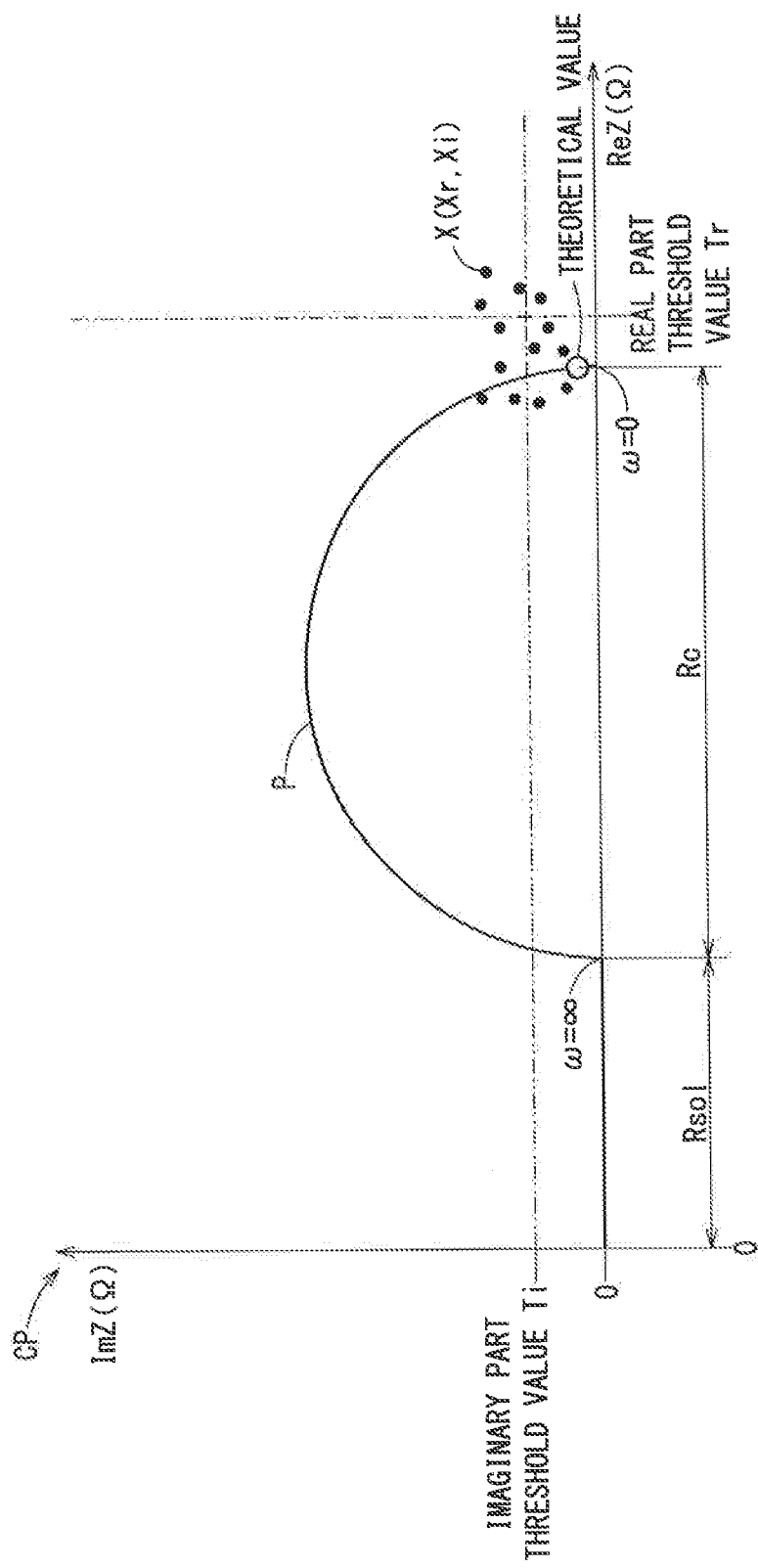
FIG. 4 is a graph showing a Cole-Cole plot concerning the equivalent circuit of the fuel cells in FIG. 3.

FIG. 4 shows so called a Cole-Cole plot P on a complex number plane CP concerning the equivalent circuit EC of the fuel cells 14. A Cole-Cole plot P represents impedance of the fuel cells 14 in the case where the impedance measuring apparatus 16 applies alternating current to the fuel cells 14 while changing its frequency ω. In this case, theoretically, a Cole-Cole plot P is made up of a straight segment extending along the real axis as shown by a bold line in FIG. 4 and one semi-circular segment connected to this straight segment. The straight segment up to a connection point connected to the semi-circular segment (one end of the semi-circular segment) represents the direct current resistance Rsol, and this connection point of the semi-circular segment corresponds to a case where the frequency ω of the alternating current is ∞. The semi-circular segment representing the reaction resistance Rc is drawn on a side toward the imaginary axis as a circular arc in correspondence with the change of the frequency ω of the alternating current. The other end of the semi-circular segment corresponds to a case where the frequency ω of the alternating current is 0, and represents Rsol+Rc.

A Cole-Cole plot P shown in FIG. 4 is a theoretical plot. In actual operation of the fuel cells 14, since the state of the solid polymer electrolyte membrane 44 (in particular, humidified state) changes, measured points X of impedance tends to be scattered around the bold line. For example, in the case where alternating current at a low frequency of 10 Hz or less (in the embodiment of the present invention, 1 Hz) is applied, basically, almost no electric current flows through the electric double layer capacitor Cd. Therefore, the theoretical value of impedance of the fuel cells 14 has an actual axis value (Rsol+Rc) closer to the real axis as shown by a white blank circle of a Cole-Cole plot P.

However, by the change in the water content of the fuel cells 14, the number of measured points X of impedance is increased on a side closer to the imaginary part as shown by black circles for various reasons. For example, in the case where the water content is decreased, since the electrolyte membrane is dried, electricity is stored in the electric double layer capacitor Cd. That is, electrical current tends to flow through the electric double layer capacitor Cd. In contrast, in the case where the water content is increased, the reaction rate of the reactant gas is lowered due to the excessive water, and the reaction resistance Rc is decreased relative to the electric double layer capacitance Cd. That is, electricity tends to flow through the electric double layer capacitor Cd.

Therefore, in the fuel cell system 10, alternating current at a low frequency (10 Hz or less) is supplied to the fuel cell stack 12 (fuel cells 14) to measure impedance, and to determine whether the water content is normal or abnormal based on the imaginary axis value Xi of the measured point X. Specifically, the determination unit 122 of the controller 24 determines the imaginary part threshold value Ti of impedance on the complex number plane CP beforehand, e.g., experimentally and determines whether the imaginary axis value Xi of the measured impedance exceeds the imaginary part threshold value Ti or not. In this manner, it is possible to simply identify the large change of the water content of the fuel cells 14. For example, if only one imaginary axis value Xi is deviated from the theoretical value (or imaginary part threshold value Ti) significantly, the determination unit 122 should make a determination without taking the measurement data into consideration.

In this regard, if the frequency ω of the alternating current supplied to the fuel cells 14 is larger than 10 Hz, the theoretical value (white blank circle) tends to be shifted toward the imaginary axis beforehand. Therefore, it is difficult to detect the flooding state due to the strong influence of the electric double layer capacitor Cd. That is, in the case of detecting the water content of the fuel cells 14 using alternating current having one frequency, by setting the frequency ω to 10 Hz or less, both of the dry state and flooding state can be identified suitably.

Further, the determination unit 122 determines the real part threshold value Tr of impedance on the complex number plane CP beforehand, e.g., experimentally, and determines whether the real axis value Xr of the measured impedance exceeds the real part threshold value Tr or not. In this manner, it becomes possible to determine whether the fuel cells 14 are in the dry state or in the flooding state. That is, in the case where the fuel cells 14 are in the dry state, since the internal resistance of the fuel cells 14 is increased, the real axis value Xr becomes larger than the real part threshold value Tr. Conversely, if the fuel cells 14 are in the flooding state, since reaction of the reactant gases in the fuel cells 14 is decreased, the real axis value Xr becomes smaller than the real part threshold value Tr.

Therefore, the determination unit 122 compares the imaginary axis value Xi and the imaginary part threshold value Ti of impedance beforehand, and then, compares the real axis value Xr and the real part threshold value Tr of impedance to determine the humidified state of the fuel cells 14. Hereinafter, significance of the determination procedure performed by the determination unit 122 will be described specifically based on FIGS. 5A and 5B.

Figure 5A:
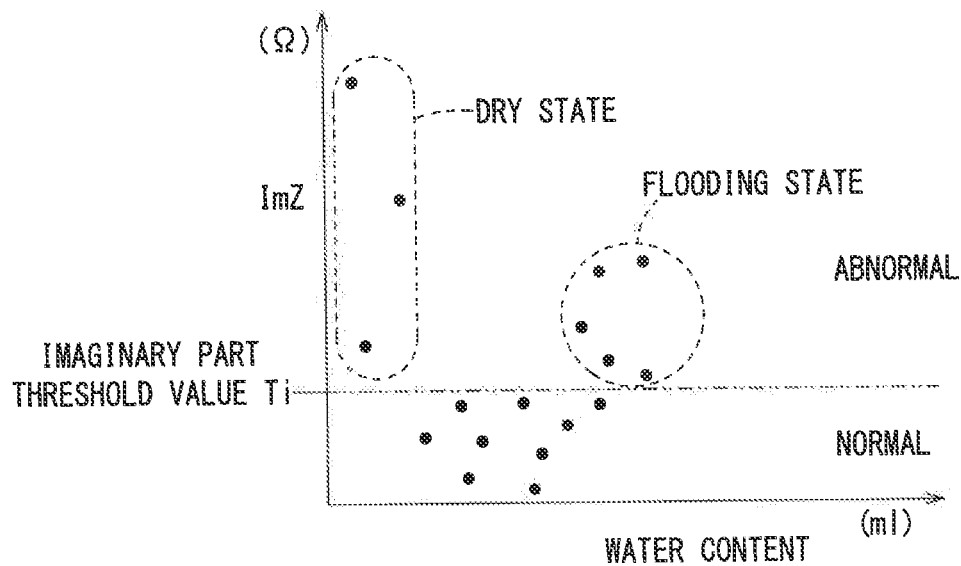
FIG. 5A is a graph showing the relationship between the imaginary axis value of impedance and the water content of the fuel cell stack.

FIG. 5A is a graph showing the relationship between the imaginary axis value Xi of impedance and the water content of the fuel cell stack 12. Black points in the graph are measured points X of impedance of the fuel cell stack 12 during power generation. The two dotted chain line denotes the imaginary part threshold value Ti. If the water content of the fuel cells 14 is within an intermediate range (suitable humidified state), the imaginary axis value Xi tends to be less than the imaginary part threshold value Ti. If the water content of the fuel cells 14 is deviated from the intermediate range toward any of both sides of the intermediate range, the imaginary axis value Xi tends to exceed the imaginary part threshold value Ti. Therefore, the determination unit 122 compares the imaginary part threshold value Ti with the imaginary axis value Xi beforehand for making a determination. In this manner, it is possible to determine whether the water content of the fuel cells 14 is normal or abnormal easily. For measurement of impedance, it should be noted that a plurality of values within a certain period of time may be extracted and averaged to use the average value.

Figure 5B:
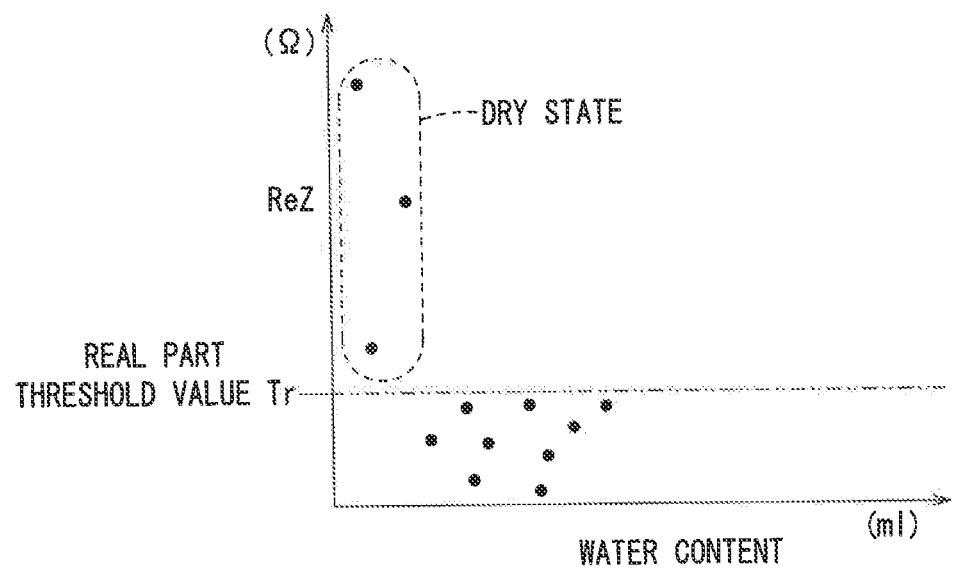
FIG. 5B is a graph showing the relationship between the real axis value of impedance and the water content of the fuel cell stack.

FIG. 5B is a graph showing the relationship between the real axis value Xr of impedance and water content of the fuel cell stack 12. The two dotted chain line denotes the real part threshold value Tr. If the fuel cells 14 are in the dry state, the real axis value Xr of impedance exceeds the real part threshold value Tr. Therefore, after the determination unit 122 compares the imaginary part threshold value Ti and the imaginary axis value Xi, if the real axis value Xr exceeds the real part threshold value Tr, the determination unit 122 can determine (identify) that the fuel cells 14 are in the dry state. Conversely, if the real axis value Xr is less than the real part threshold value Tr, the determination unit 122 can determine (identify) that the fuel cells 14 are in the flooding state.

If it is determined that the fuel cells 14 are in the dry state, the humidification quantity setting unit 124 sets the humidification quantity to a value increased from the current quantity based on the measured impedance value. The drive control unit 126 implements control to decrease the opening angle of the bypass valve 104 based on this setting value of the humidification quantity. In this manner, a larger quantity of the oxygen-containing gas flows toward the humidifier 100, and the humidification quantity of the oxygen-containing gas flowing into the fuel cell stack 12 is increased.

If it is determined that the fuel cells 14 are in the flooding state, the humidification quantity setting unit 124 sets the humidification quantity to a value decreased from the current quantity based on the measured impedance value. The drive control unit 126 implements control to increase the opening angle of the bypass valve 104 based on this setting value of the humidification quantity. It this manner, the oxygen-containing gas bypasses the humidifier 100 (a lager quantity of the oxygen-containing gas flows toward the oxygen-containing gas bypass supply channel 102), and the humidification quantity of the oxygen-containing gas flowing into the fuel cell stack 12 is decreased.

The fuel cell system 10 according to the embodiment of the present invention basically has the above structure. Hereinafter, a method of controlling humidification of the fuel cells 14 will be described in connection with operation of the fuel cell system 10.

Figure 6:
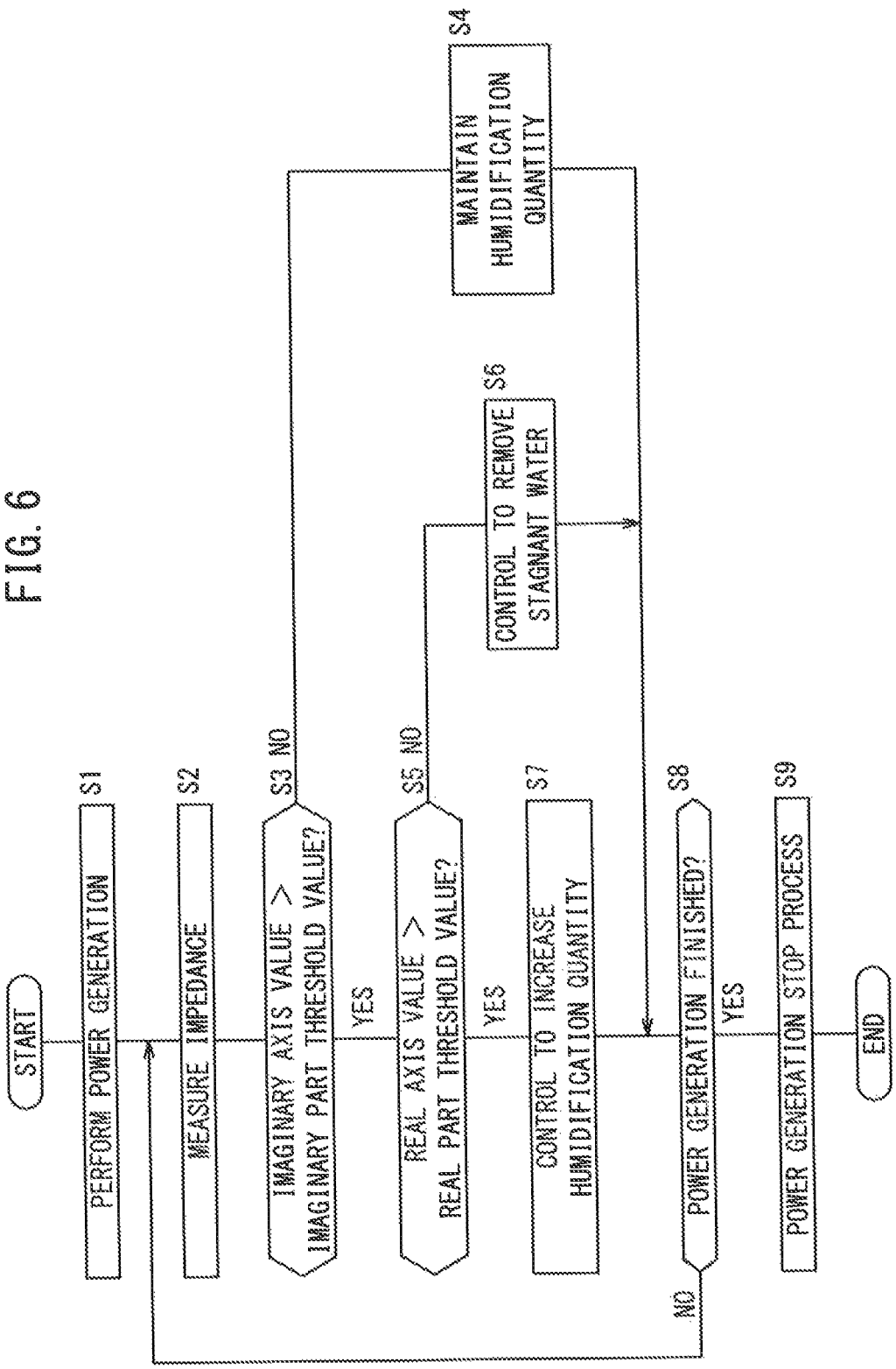
FIG. 6 is a flow chart showing the process flow of humidification control by the fuel cell system in FIG. 1.

Based on operation of an operator, the controller 24 of the fuel cell system 10 allows the fuel cell system 10 to perform power generation (step S1: see FIG. 6). At the time of starting power generation, the interruption valve 86 of the fuel gas supply system 18 is opened, and a fuel gas such as a hydrogen-containing gas is supplied from the hydrogen tank 82 to the fuel gas supply channel 84. After the pressure of this fuel gas is regulated to a predetermined pressure by the pressure reducing valve 88, the fuel gas is supplied to the fuel cell stack 12 through the ejector 92.

At the same time, the fuel cell system 10 drives the compressor 96 of the oxygen-containing gas supply system 20 to supply the oxygen-containing gas such as the air to the oxygen-containing gas supply channel 98. This oxygen-containing gas flows through the humidifier 100, and the humidified oxygen-containing gas is supplied to the fuel cell stack 12.

After the oxygen-containing gas and the fuel gas are supplied to the fuel cell stack 12, as shown in FIG. 2, the oxygen-containing gas is supplied to the oxygen-containing gas supply passage 32, and the fuel gas is supplied to the fuel gas supply passage 34. Further, a coolant such as pure water or ethylene glycol is supplied to the coolant supply passage 40.

The oxygen-containing gas flows into each oxygen-containing gas flow field 50 of the first separator 28, and moves along the cathode 46 of the membrane electrode assembly 26. In the meanwhile, the fuel gas supplied to the fuel gas supply passage 34 flows into each fuel gas flow field 54 of the second separator 30, and moves along the anode 48 of the membrane electrode assembly 26.

Thus, in each of the membrane electrode assemblies 26, the oxygen-containing gas supplied to the cathode 46, and the fuel gas supplied to the anode 48 are partially consumed in the electrochemical reactions at catalyst layers of the cathode 46 and the anode 48 for generating electricity. The oxygen-containing gas partially consumed at the cathode 46 is discharged into the oxygen-containing gas discharge passage 38. Likewise, after some of hydrogen of the fuel gas supplied to the anode 48 is consumed, the fuel gas is discharged into the fuel gas discharge passage 36. Thereafter, the fuel gas and the oxygen-containing gas are discharged from the fuel cell stack 12 to the outside through the gas discharge system 22. Some of the fuel gas is circulated from the gas discharge system 22 to the fuel gas supply system 18 through the fuel circulation channel 90, and utilized again.

Further, the coolant supplied to the coolant supply passage 40 flows into each coolant flow field 52 between the first separator 28 and the second separator 30. After this coolant cools the membrane electrode assembly 26, the coolant is discharged into the coolant discharge passage 42.

As shown in FIG. 1, the output of the fuel cell stack 12 during power generation is supplied to the external load 68. Further, for implementing humidification control of the fuel cell stack 12, the controller 24 performs a step of measuring impedance by the impedance measuring apparatus 16 (step S2: see FIG. 6) at the time of power generation. In the measuring step, for example, alternating current having a constant frequency ω of, e.g., 1 Hz is applied to the fuel cell stack 12 by the alternating current generator 76 of the impedance measuring apparatus 16. An electrical current value of the alternating current flowing through the fuel cell stack 12 is detected by the alternating current measuring instrument 78, and a voltage value of alternating voltage applied to the fuel cell stack 12 is detected by the alternating current voltage measuring instrument 80. Based on the electrical current value and the voltage value, the impedance measuring apparatus 16 calculates impedance of the fuel cell stack 12. It should be noted that the setting value for the imaginary part threshold value Ti does not change depending on electrical current collected from the fuel cell stack 12 to the external load 68.

After the controller 24 performs measurement of impedance, the controller 24 performs the process of making a determination based on the measurement results of impedance (measured points X) according to the flow shown in FIG. 6. Specifically, the controller 24 acquires impedance measured by the impedance measuring apparatus 16 through the impedance acquisition unit 120. Then, the determination unit 122 of the controller 24 determines whether the acquired imaginary axis value Xi of impedance exceeds the preset imaginary part threshold value Ti (step S3: determination step).

In step S3, if the determination unit 122 determines that the imaginary axis value Xi does not exceed the imaginary part threshold value Ti, the routine proceeds to step S4. If the determination unit 122 determines that the imaginary axis value Xi exceeds the imaginary part threshold value Ti, the routine proceeds to step S5. If the imaginary axis value Xi does not exceed the imaginary part threshold value Ti, it can be considered that the water content of the fuel cell stack 12 does change significantly, and the water content is normal. Therefore, in step S4, the humidification quantity setting unit 124 sets the humidification quantity of the humidifier 100 such that the humidification quantity for the oxygen-containing gas supplied to the fuel cell stack 12 is maintained (adjustment step). Therefore, the humidified state of the fuel cell stack 12 is maintained as it is.

If the imaginary axis value Xi exceeds the imaginary part threshold value Ti, it is determined that the water content of the fuel cell stack 12 is abnormal. After making the determination in this manner, the determination unit 122 determines whether the acquired real axis value Xr of impedance exceeds the preset real part threshold value Tr (step S5: determination step).

If the determination unit 122 determines that the real axis value Xr does not exceed the real part threshold value Tr, the routine proceeds to step S6. If the determination unit 122 determines that the real axis value Xr exceeds the real part threshold value Tr, the routine proceeds to step S7. As described above, if the real axis value Xr does not exceed the real part threshold value Tr, it can be considered that the fuel cell stack 12 is in the flooding state, and if the real axis value Xr exceeds the real part threshold value Tr, it can be considered that the fuel cell stack 12 is in the dry state.

In step S6, the controller 24 implements control to remove stagnant water (adjustment step). Specifically, the humidification quantity setting unit 124 sets the humidification quantity of the oxygen-containing gas to a value decreased from the current quantity. Based on this setting value, the drive control unit 126 increases the opening angle of the bypass valve 104 of the oxygen-containing gas supply system 20 to increase the bypassing quantity, and thus, decrease the humidification quantity. Alternatively, the drive control unit 126 may control the compressor 96 to regulate the flow rate of the oxygen-containing gas to be increased. Further, the drive control unit 126 may decrease the electric current collected to the external load 68 to decrease the produced water, and thus, decrease the humidification quantity of the oxygen-containing gas. In this manner, the decrease in the water content in the fuel cell stack 12 is facilitated.

In step S7, the controller 24 implements control to increase humidification quantity (adjustment step). Specifically, the humidification quantity setting unit 124 sets the humidification quantity of the oxygen-containing gas to a value increased from the current quantity. Based on this setting value, the drive control unit 126 decreases the opening angle of the bypass valve 104 of the oxygen-containing gas supply system 20 to decrease the bypassing quantity, and thus, to increase the humidification quantity. Incidentally, the drive control unit 126 may increase the electric current collected to the external load 68 to increase the produced water, and thus, increases the humidification quantity of the oxygen-containing gas. In this manner, increase in the water content in the fuel cell stack 12 is facilitated.

After the above adjustment steps (steps S4, S6, and S7) are performed, the fuel cell system 10 determines whether power generation by the fuel cell stack 12 should be finished or continued (step S8). If the fuel cell system 10 determines that power generation by the fuel cell stack 12 should be continued, the routine returns to step S2 to repeat the similar procedure. If the fuel cell system 10 determines that power generation by the fuel cell stack 12 should be finished, the fuel cell system 10 performs the process of stopping power generation (step S9), and the fuel cell system 10 stops its operation.

The humidification control method for the fuel cells 14 is not limited to the above process flow, and various processes can be implemented. For example, in step S5, the controller 24 may compare the real part threshold value Tr and the real axis value Xr to determine the dry state or the flooding state of the fuel cells 14, and simplify the subsequent determination process to be repeated. For example, if the controller 24 determines that the fuel cells 14 are in the dry state, since the imaginary axis value Xi exceeds the imaginary part threshold value Ti until the dry state is finished, the controller 24 may only compare the real axis value Xr and the real part threshold value Tr. That is, in the subsequent repeating process, step S3 can be omitted. Such operation can be performed easily, e.g., by setting a flag when the real axis value Xr exceeds the real part threshold value Tr, and monitoring the flag.

As described above, in the fuel cell system 10 and a method of controlling humidification of the fuel cells 14 according to the embodiment of the present invention, it is possible to suitably control the water content in the fuel cells 14. That is, the determination of the water content in the fuel cells 14 can be made simply, by only applying alternating current at a low frequency to use only impedance at this time. Therefore, it becomes possible to rapidly measure impedance of the fuel cells 14, and determine the humidified state (water content) of the fuel cells 14 based on the measured impedance easily.

In this regard, in the conventional humidification control method, as described above, alternating current is applied at a plurality of different frequencies ω. In this case, for generation of alternating current at different frequencies ω, the structure and control of the impedance measuring apparatus (alternating current generator) are complicated undesirably. Further, at the time of power generation, since alternating current at a plurality of frequencies ω is applied at different timings, measurement of impedance is time consuming, and thus, it is difficult to control humidification in real time in accordance with the humidified state in the fuel cells.

Figure 7:
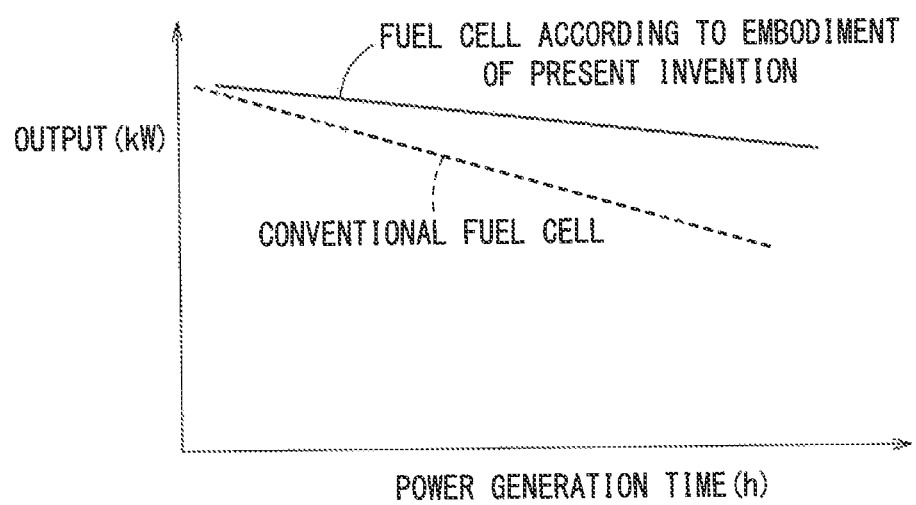
FIG. 7 is a graph showing the relationship between the power generation time and the output of the fuel cell stack.

In contrast, in the humidification control method by the fuel cell system 10, the humidification quantity can be changed immediately in accordance with changes in the water content in the fuel cells 14. Accordingly, as shown in FIG. 7, it is possible to suitably suppress degradation of the fuel cell stack 12. That is, if the power generation time of the fuel cell stack 12 is prolonged due to the continuous use, the output power is decreased due to degradation of the membrane electrode assembly 26 (e.g., oxidation of the electrodes) as shown by a dotted line. Oxidation or the like of the electrodes occurs relatively easily when the dry state occurs inside the fuel cells 14. Therefore, rapid humidification control is desired.

In the fuel cell system 10 and the method of controlling humidification of the fuel cells 14 according to the embodiment of the present invention, by simplifying measurement of impedance, it is possible to take actions for maintaining the water content of the fuel cells 14 rapidly and suitably. Consequently, degradation of the membrane electrode assembly 26 is suppressed, and the product life of the fuel cell stack 12 is extended. Further, by simplifying the structure and control, etc. of the impedance measuring apparatus 16, the production cost can be reduced as well.

In this case, in the humidification control method, the determination unit 122 makes a determination based on the imaginary axis value Xi of the measured impedance and the preset imaginary part threshold value Ti beforehand. In this manner, it is possible to determine whether the water content of the fuel cells 14 is normal or abnormal easily. Further, after determining that the water content of the fuel cells 14 is abnormal, by determining that the real axis value Xr exceeds the real part threshold value Tr, it becomes possible to identify the dried state in the fuel cells 14 in a short period of time. Accordingly, control to increase the humidification quantity of the fuel cells 14 can be implemented immediately. Otherwise, after determining that the water content of the fuel cells 14 is abnormal, by determining that the real axis value Xr does not exceed the real part threshold value Tr, it becomes possible to identify the flooding state in the fuel cells 14 in a short period of time. Accordingly, control to decrease the humidification quantity of the fuel cells 14 can be implemented immediately.

While the invention has been described with reference to a preferred embodiment, it is a matter of course that the present invention is not limited to the embodiment, and various modifications can be effected without departing from the gist of the present invention.

What is claimed is:

1. A method of controlling humidification of a fuel cell formed by stacking an electrolyte electrode assembly and a separator, the electrolyte electrode assembly including a cathode, an anode, and an electrolyte interposed between the cathode and the anode, the method comprising the steps of:
   measuring impedance of the fuel cell during power generation of the fuel cell based on supply of alternating current consisting of measuring alternating current at one fixed value of a frequency of 10 Hz or less; and
   adjusting humidification quantity of the fuel cell based on an imaginary axis value and a real axis value on a complex number plane of measured impedance after the measuring step.

2. The method of controlling humidification of the fuel cell according to claim 1, further comprising, after the measurement step, a step of making a determination based on a preset imaginary part threshold value and an imaginary axis value, and then, making a determination based on a preset real part threshold value and the real axis value.

3. The method of controlling humidification of the fuel cell according to claim 2, wherein if it is determined that the imaginary axis value exceeds the imaginary part threshold value and the real axis value exceeds the real part threshold value in the determination step, the humidification quantity of the fuel cell is increased in the adjustment step.

4. The method of controlling humidification of the fuel cell according to claim 2, wherein if it is determined that the imaginary axis value exceeds the imaginary part threshold value and the real axis value does not exceed the real part threshold value in the determination step, the humidification quantity of the fuel cell is decreased in the adjustment step.

5. A method of controlling humidification of a fuel cell formed by stacking an electrolyte electrode assembly and a separator, the electrolyte electrode assembly including a cathode, an anode, and an electrolyte interposed between the cathode and the anode, the method comprising the steps of:

measuring impedance of the fuel cell during power generation of the fuel cell based on supply of alternating current consisting of the step of measuring alternating current at one fixed value of a frequency of 10 Hz or less; and adjusting humidification quantity of the fuel cell based on an imaginary axis value and a real axis value on a complex number plane of measured impedance after the measuring step by increasing or decreasing a flow of oxygen gas through a humidifier prior to supply of the oxygen gas to the fuel cell.

6. A fuel cell system including a fuel cell formed by stacking an electrolyte electrode assembly and a separator, the electrolyte electrode assembly including a cathode, an anode, and an electrolyte interposed between the cathode and the anode, the fuel cell system comprising:

a measuring apparatus for measuring impedance of the fuel cell during power generation of the fuel cell consisting of measuring alternating current at one fixed value of a frequency of 10 Hz or less; and a control unit for controlling humidification quantity of the fuel cell based on an imaginary axis value and a real axis value on a complex number plane of the impedance measured by the measuring apparatus.

* * * * *